United States Patent
Nimura et al.

(10) Patent No.: US 8,002,068 B2
(45) Date of Patent: Aug. 23, 2011

(54) FINAL GEAR TRANSMISSION MECHANISM FOR A MOTORCYCLE, AND MOTORCYCLE INCORPORATING SAME

(75) Inventors: Taisuke Nimura, Saitama (JP); Kiyotaka Sakai, Saitama (JP); Kenji Kofuji, Saitama (JP); Yoshinobu Shiomi, Saitama (JP); Hidetoshi Toyoda, Saitama (JP); Yasuhiro Higashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 101 days.

(21) Appl. No.: 12/378,688

(22) Filed: Feb. 18, 2009

(65) Prior Publication Data

US 2009/0236168 A1    Sep. 24, 2009

(30) Foreign Application Priority Data

Mar. 18, 2008    (JP) ................................. 2008-070236

(51) Int. Cl.
*B62M 17/00* (2006.01)
*B62D 61/02* (2006.01)

(52) U.S. Cl. ........................... 180/226; 180/219; 74/609
(58) Field of Classification Search .................. 180/226, 180/219; 74/609
See application file for complete search history.

(56) References Cited

U.S. PATENT DOCUMENTS

| 4,436,173 | A | * | 3/1984 | Takahashi | 180/226 |
|---|---|---|---|---|---|
| 4,811,810 | A | | 3/1989 | Watanabe | |
| 7,644,797 | B2 | * | 1/2010 | Kofuji | 180/227 |
| 7,717,211 | B2 | * | 5/2010 | Ito et al. | 180/226 |
| 7,717,213 | B2 | * | 5/2010 | Ito et al. | 180/227 |
| 2007/0193806 | A1 | * | 8/2007 | Ito et al. | 180/227 |
| 2008/0236331 | A1 | * | 10/2008 | Nimura et al. | 74/606 R |

FOREIGN PATENT DOCUMENTS

| EP | 1 978 215 A2 | 10/2008 |
|---|---|---|
| JP | 2-393 | 1/1990 |
| WO | WO 03/093096 A1 | 11/2003 |

* cited by examiner

*Primary Examiner* — Anne Marie M Boehler
*Assistant Examiner* — Marlon A Arce
(74) *Attorney, Agent, or Firm* — Carrier Blackman & Associates, P.C.; William D. Blackman; Joseph P. Carrier

(57) ABSTRACT

A motorcycle includes a swing arm, a rear wheel mounted on a leading end of the swing arm, a drive shaft disposed in the swing arm, and a final gear transmission mechanism interposed between the drive shaft and the rear wheel. The final gear transmission mechanism includes a gear case mounted on the leading end of the swing arm for supporting a rear axle; a first end bearing and a second end bearing for supporting a first end and a second end of the rear axle, respectively, a ring gear mounted on the rear axle for transmitting the rotary drive force of an engine to the rear axle; a holding portion for holding the first end of the rear axle in the axial direction of the rear axle; and a fastening member for fastening the second end bearing to the second end of the rear axle.

14 Claims, 4 Drawing Sheets

EMBODIMENT

COMPARATIVE EXAMPLE

FINAL GEAR TRANSMISSION MECHANISM FOR A MOTORCYCLE, AND MOTORCYCLE INCORPORATING SAME

CROSS-REFERENCE TO RELATED APPLICATIONS

The present invention claims priority under 35 USC 119 based on Japanese patent application No. 2008-070236, filed on Mar. 18, 2008. The entire subject matter of this priority document, including specification claims and drawings, is incorporated by reference herein.

BACKGROUND OF THE INVENTION

1. Field of the Invention

The present invention relates to a final gear mechanism for a motorcycle. More particularly, the present invention relates a motorcycle in which a final gear transmission mechanism is interposed between a drive shaft and a rear wheel.

2. Description of the Background Art

There is known a motorcycle in which a final gear transmission mechanism for transmitting a rotary drive force of an engine is interposed between a drive shaft and a rear wheel. An example of such final gear transmission mechanism is disclosed in the Japanese Utility Model publication No. 2-393 (see FIG. 5 thereof).

According to the Japanese Utility Model publication No. 2-393, as shown in FIG. 5 thereof, the final gear transmission mechanism includes a pinion gear 3 (same reference numbers are used here as they are in the cited document), a ring gear 4 meshed with the pinion gear 3, a cylindrical sleeve attached with the ring gear 4, and provided for rotation around a rear axle 24, and a rear wheel 6 integrally joined to the cylindrical sleeve. The drive force of the pinion gear 3 is transmitted to the rear wheel 6.

Incidentally, according to the Japanese Utility Model publication No. 2-393, the sleeve attached with the ring gear 4 is inserted into the rear axle 24 in the axial direction thereof toward the rear wheel 6. The sleeve is a member permitted to slightly move in the axial direction of the rear axle 24.

When the sleeve is axially movable, the ring gear 4 integrally attached to the sleeve is axially moved along with the movement of the sleeve. This disadvantageously varies the meshing state between the ring gear 4 and the pinion gear 3, which may probably cause e.g. gear noise. Therefore, it is desirable to improve the final gear transmission mechanism for achieving desired, stabilized meshing state between a ring gear and a pinion gear of the final transmission mechanism.

The present invention has been made to overcome such drawbacks of the existing final gear transmission mechanism. Accordingly, it is one of the objects of the present invention to provide a motorcycle including a final gear transmission mechanism having increased fastening rigidity of a rear axle attached with a ring gear in order to stabilize a meshing state between a ring gear and a pinion gear meshed with the ring gear.

SUMMARY OF THE INVENTION

In order to achieve the above objects, the present invention according to a first aspect provides a motorcycle having a swing arm swingably mounted to a pivot shaft provided in a body frame, a rear wheel mounted to a leading end of the swing arm, a drive shaft for transmitting rotary drive force of an engine housed in the swing arm, and a final gear transmission mechanism for transmitting the rotary drive force of the engine interposed between the drive shaft and the rear wheel.

The final gear transmission mechanism according to the first aspect of the present invention includes a gear case mounted to the leading end of the swing arm for supporting the rear axle to transmit the rotary drive force of the engine to the rear wheel; a first end bearing and the second end bearing attached to the gear case to support a first end (one end) and a second end (the other end) of the rear axle, respectively; a ring gear mounted on the rear axle to transmit the rotary drive force of the engine to the rear axle; a holding portion attached to the gear case for holding the first end of the rear axle via the first end bearing in an axial direction of the rear axle; and a fastening member for fastening the second end of the rear axle via the second end bearing from the outside of the gear case.

The final gear transmission mechanism according to the first aspect of the present invention is characterized in that the second end bearing includes an inner race and an outer race, and that the inner race is fastened to the rear axle by the fastening member.

The present invention according a second aspect thereof is characterized in that the gear case is provided with a second end holding portion (an other-end holding portion) for holding the second end of the rear axle via the second end bearing in the axial direction of the rear axle, and that a lateral surface of the outer race is abutted against the second end bearing.

The present invention according a third aspect thereof is characterized in that a disk brake is attached to the first end of the rear axle in such a manner as to be gripped by the first end of the rear axle and the rear wheel.

EFFECTS OF THE INVENTION

According the first aspect of the present invention, the final gear transmission mechanism includes the first end holding portion for holding the first end of the rear axle attached with the ring gear via the first end bearing in the axial direction of the rear axle, and the fastening member for fastening the second end of the rear axle via the second end bearing from the outside of the gear case.

The first end of the rear axle is held by the first end holding portion, and the inner race is fastened to the rear axle by the fastening member so that the rear axle may not axially move or slide. Therefore, the rear axle can be held by the gear case such that the rear axle does move in an axial direction thereof. As a result, the axial movement of the ring gear provided at the rear axle can be suppressed.

If the axial movement of the ring gear is suppressed, the meshing state between the ring gear and the pinion gear provided close to the drive gear to be meshed therewith can be stabilized. If the meshing state between the ring gear and the pinion gear is stabilized, drive torque becomes less variable, which allows for stable transmission of the rotary drive force. In addition, gear noise with respect to the transmission of the rotary drive force can be reduced.

According the second aspect of the present invention, the gear case is provided with the second end holding portion for holding the second end of the rear axle via the second end bearing in the axial direction of the rear axle, and the lateral surface of the outer race of the second end bearing is abutted against the second end holding portion.

In addition to the first end bearing, the lateral surface of the outer race of the second end bearing is held by the second end holding portion provided on the gear case. Therefore, the fastening rigidity in the axial direction of the rear axle can further be increased.

According the third aspect of the present invention, the brake disk is attached so as to be gripped by the rear axle and the rear wheel.

When the rear wheel is attached to the rear axle, the brake disk is locked, the rear wheel is abutted against the brake disk, and both are co-fastened to each other. Since the brake disk is co-fastened to the rear wheel, a fastening member exclusively required for securing the brake disk is eliminated. Since the dedicated fastening member is eliminated, assembly man-hours can be reduced.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Figure 1:
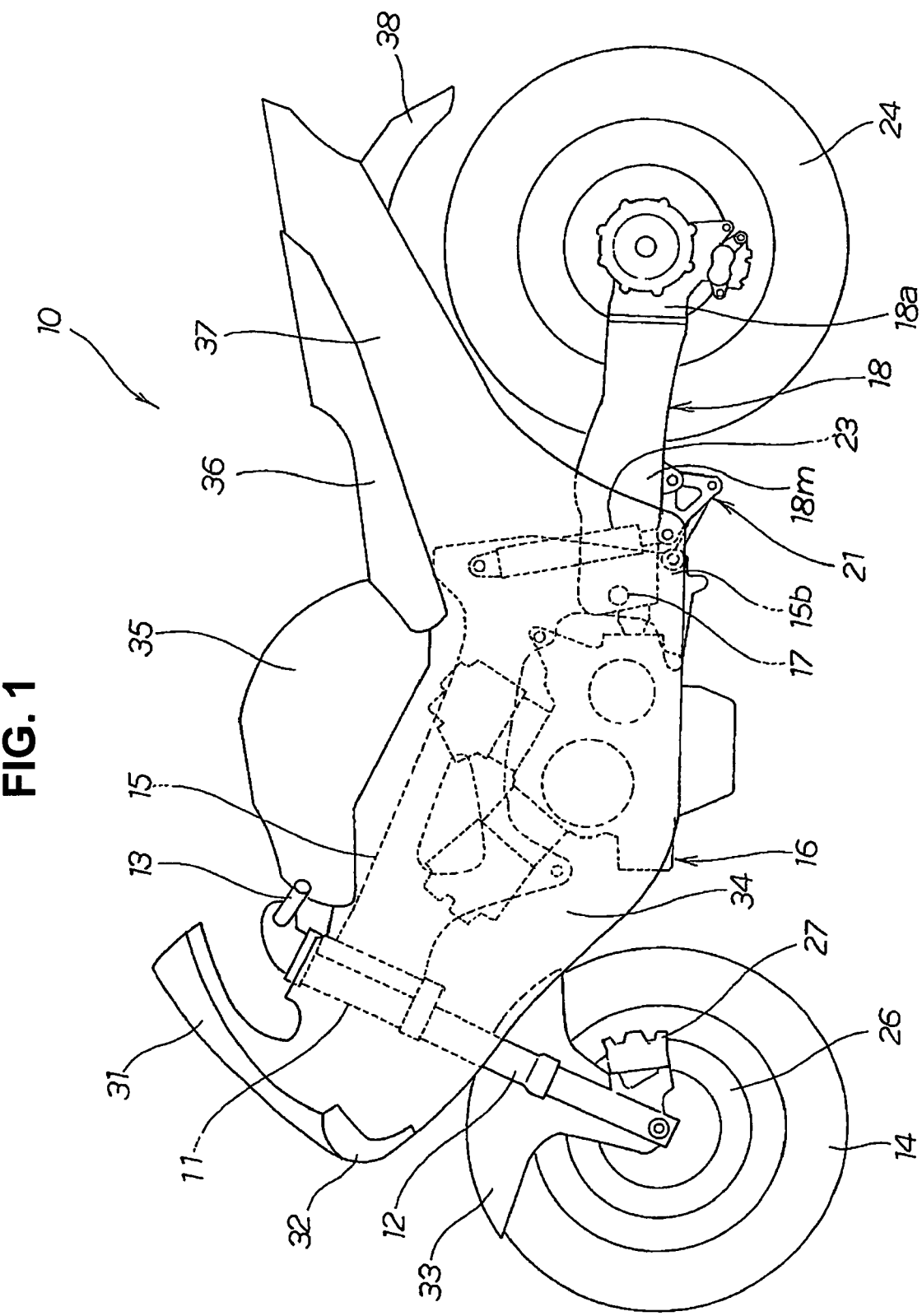
FIG. 1 is a left lateral view of a motorcycle according to the present invention.

FIG. 1 is a left side view of a motorcycle 10 according to the present invention. The motorcycle 10, as main components thereof, includes a head pipe 11; a front fork 12 steerably mounted to the head pipe 11; a steering handlebar 13 and a front wheel 14 mounted to an upper end and a lower end of the front fork 12, respectively; a body frame 15 mounted to the head pipe 11 and extended rearwardly.

The motorcycle 10 further includes an engine 16, as a drive source, suspended by the body frame 15; a swing arm 18 attached to the rear end of the body frame 15 so as to be rearwardly swingable with a pivot shaft 17, which serves as a fulcrum; a rear cushion member (a shock absorber) 23, attached via a link 21, between an intermediate portion 18m of the swing arm 18 and a rear portion 15b of the body frame 15; and a rear wheel 24 attached to a leading end 18a of the swing arm 18 and driven by the engine 16.

A disk-like front brake disk 26 is attached to the front wheel 14. A front disk brake unit 27 for braking rotation of the front wheel 14 is attached to the lower portion of the front fork 12 adapted to grip the front brake disk 26.

The motorcycle 10 further includes an upper cowl 31, a headlamp 32, a front fender 33, a main cowl 34, a fuel tank 35, an occupant seat 36, a seat cowl 37, and a rear fender 38.

Figure 2:
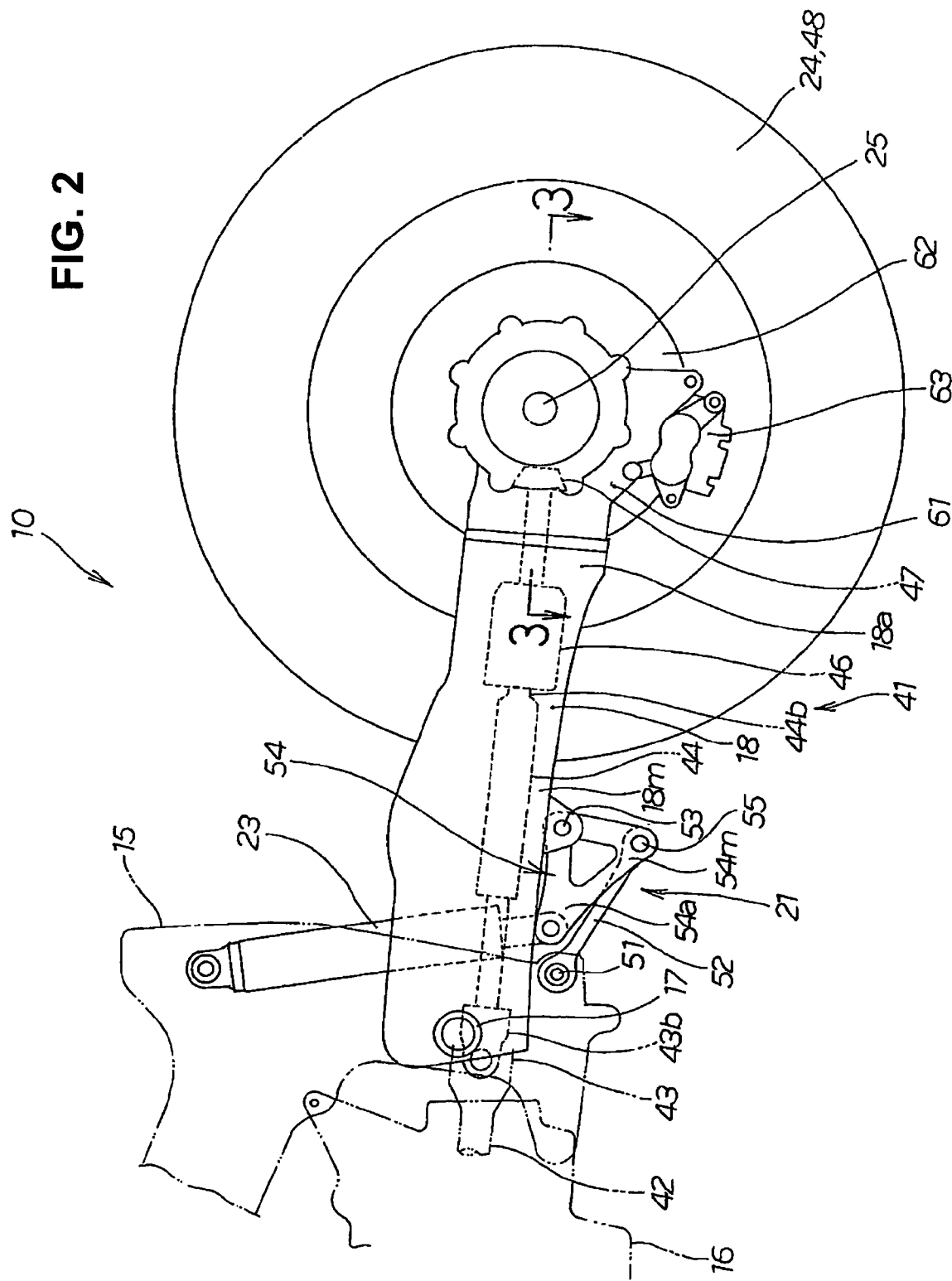
FIG. 2 is a lateral view of a rear portion of the motorcycle according to the present invention.

FIG. 2 is a side view of a rear portion of the motorcycle 10 according to the present invention. The motorcycle 10 includes the body frame 15; the engine 16 suspended by the body frame 15; the pivot shaft 17 provided at the rear portion of the body frame 15; the swing arm 18 swingably mounted on the pivot shaft 17; the rear wheel 24 rotatably supported via the rear axle 25 by a rear portion of the leading end 18a of the swing arm 18; and the rear cushion member 23 interposed between the swing arm 18 and the body frame 15.

A rear wheel drive mechanism 41 includes a universal joint 43 coupled with an output shaft 42 of the engine 16 for transmitting a rotary drive force of the engine 10 to the rear wheel 24; a drive shaft 44 coupled with a rear end 43b of the universal joint for transmitting the drive force of the engine 16; a shaft-length variable mechanism 46 coupled with the rear end 44b of the drive shaft 44 making the shaft-length of the drive shaft variable; and a pinion gear 47 coupled with the shaft-length variable mechanism 46 for changing the direction of the drive force and transmitting the drive force to the rear axle 25.

According to the present embodiment, the shaft-length variable mechanism 46 uses a tripod constant-velocity joint. However, the shaft-length variable mechanism 46 is not limited to the use of the tripod constant-velocity joint. The shaft-length variable mechanism 46 may use a ball-spline sliding joint, a cross-groove joint or the like. As long as the joints have a sliding function, its configuration is not restrictive.

With reference to FIGS. 1 and 2, the motorcycle 10 includes the swing arm 18 swingably provided on the body frame 15 via the pivot shaft 17; and the rear wheel 24 as a drive wheel 48 rotatably supported by the swing arm 18, and rotated by the drive shaft 44 transmitting the drive force of the engine 16. The rotary drive force from the engine 16 is transmitted to the rear wheel 24 via the drive shaft 44 and via the universal joint 43. The drive shaft 44 is disposed inside the swing arm 18.

The link 21 provided on the swing arm 18 includes a first arm member 52, a second arm member 54, a rear cushion member 23, and a third swing shaft 55. The first arm member 52 is swingably provided to extend rearwardly from the body frame 15 via the first swing shaft 51. The second arm member 54 is swingably provided to extend forward from the intermediate portion 18m of the swing arm 18 via a second swing shaft 53.

The rear cushion member 23 is interposed between a leading end 54a of the second arm member 54 and the body frame 15. The third swing shaft 55 swingably attaches the leading end of the first arm member 52 to the intermediate portion 54m of the second arm member 54. The rear cushion member 23 is adapted to absorb vibration or the like applied to the swing arm 18.

A gear case 61 is disposed at the leading end 18a of the swing arm. The gear case 61 houses the rear axle 25 and drive train elements on the peripheries thereof. As shown in FIG. 2, a rear brake disk 62 and a rear disk brake unit 63 are associated with the rear wheel 24.

In other words, the motorcycle 10 is a vehicle in which the swing arm 18 is swingably attached to the pivot shaft 17 provided in the body frame 15, the rear wheel 24 is mounted on the leading end 18a of the swing arm 18, the drive shaft 44 for transmitting the rotary drive force of the engine 16 is housed in the swing arm 18, and the final gear transmission mechanism 65 including the rear wheel drive mechanism 41 for transmitting the rotary drive force of the engine 16 is interposed between the drive shaft 44 and the rear wheel 24.

Figure 3:
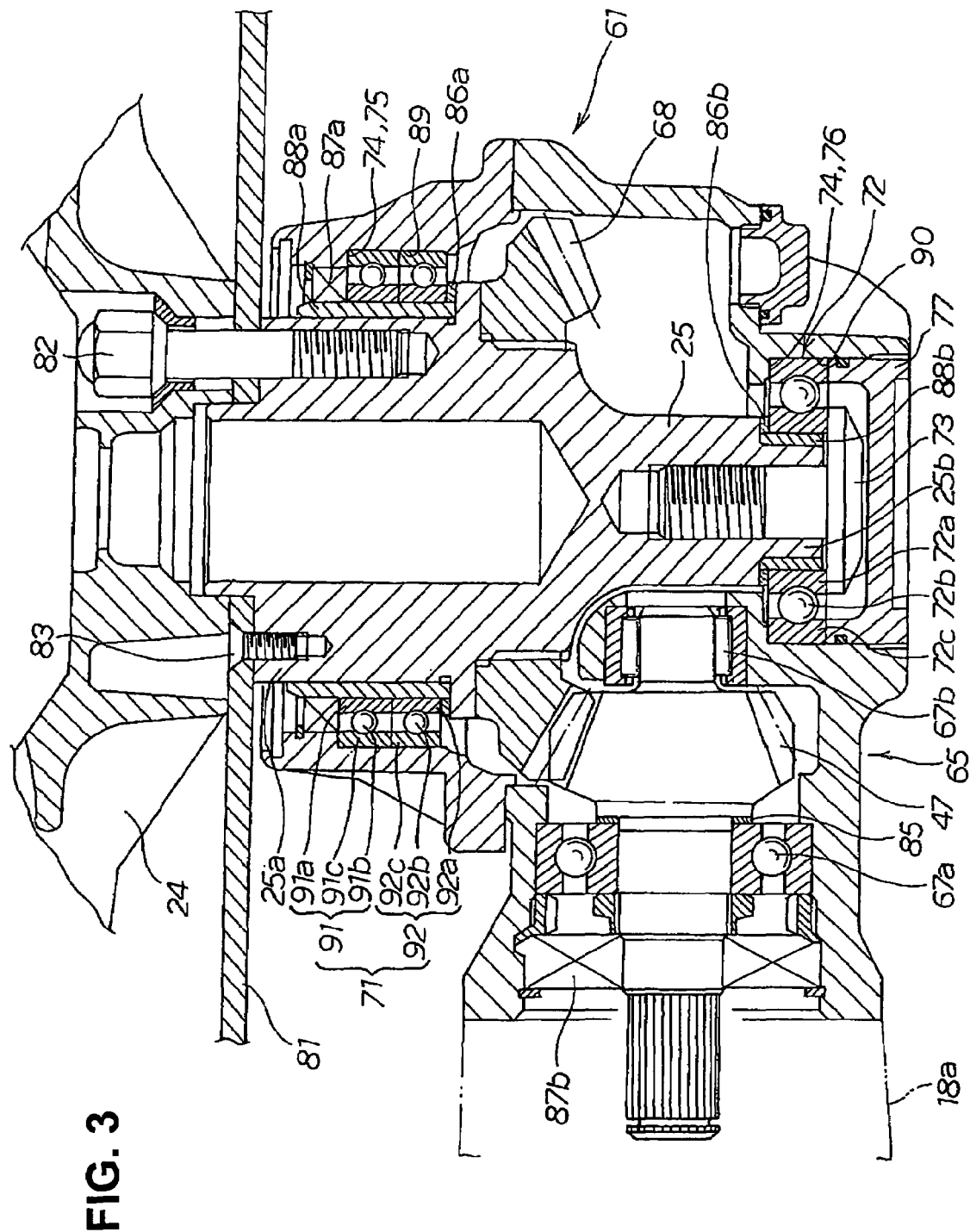
FIG. 3 is a cross-sectional view taken along a line 3-3 of FIG. 2.

The final gear transmission mechanism 65 is described with reference to the following drawing. FIG. 3 is a cross-sectional view taken along line 3-3 of FIG. 2, showing details of the final gear transmission mechanism 65 disposed at the leading end 18a of the swing arm 18.

The final gear transmission mechanism 65, as main constituent elements thereof, includes the gear case 61 mounted on the leading end 18a of the swing arm 18; bearings 67a, 67b disposed at the front portion of the gear case 61; the pinion gear 47, as a drive-side gear, carried by the bearings 67a, 67a; a ring gear 68, as a driven-side gear, disposed perpendicularly to and meshed with the pinion gear 47 to receive drive force transmitted thereto; the rear axle 25 as a drive force transmission shaft attached with the ring gear 68 via a spline portion; a first end bearing 71 supporting one end (first end) 25a of the rear axle 25; a second end bearing 72 supporting an other end (second end) 25b of the rear axle 25 disposed outwardly of the vehicle with respect to the first end 25a; and a fastening member 73 fastening between an inner race 72a of the second end bearing 72 and the rear axle 25 from the outside of the vehicle. A cap 77 is attached to the gear case 61 for covering the head of the fastening member 73.

The bearings supporting the rear axle 25 is hereinafter described in detail.

The first end bearing and the second end bearings 71, 72 supporting the rear axle 25 use a radial ball bearing. The radial ball bearing includes an inner race, a plurality of balls disposed on the outer circumference of the inner race, and an outer race disposed outward of the balls.

Specifically, the first end bearing 71 includes a first bearing 91 and a second bearing 92 axially juxtaposed to each other. The first bearing 91 includes an inner race 91a, balls 91b and an outer race 91c. The second bearing 92 includes an inner race 92a, balls 92b, and outer races 92c.

The second end bearing 72 includes an inner race 72a, balls 72b and an outer race 72c.

The first end 25a of the rear axle 25 is provided with a one-end holding portion (a first end holding portion) 75, as a holding portion 74, capable of holding the rear axle 25 via the first end bearing 71 in the axial direction and inwardly of the vehicle.

The second end 25b of the rear axle 25 is provided with the other-end holding portion (second end holding portion) 76, as a holding portion 74, for holding the rear axle 25 via the second end bearing 72 in the axial direction and inwardly of the vehicle, and with a fastening member 73 for fastening the second end bearing 72 from the outside of the gear case 61.

The fastening member 73 fastens the inner race 72a of the second end bearing 72 to the rear axle 25 for restricting the axial movement of the rear axle 25.

The gear case 61 is provided with the holding portion 74 for restricting the axial movement of the bearing. This holding portion 74 includes the first end holding portion 75 axially holding an outer race 91c of the first bearing as a constituent element of the first end bearing 71; and the second end holding portion 76 axially holding an outer race 72c of the second end bearing.

A lateral surface of the outer race 71c of the first end bearing 71 and a lateral surface of the outer race 72c of the second end bearing 72 are held by the first end holding portion 75 and the second end holding portion 76, respectively. In addition, a lateral surface of the inner race 72a of the second end bearing 72 is fastened to the rear axle 25 by the fastening member 73.

The gear case 61 is provided with the second end holding portion 76 for holding the second end 25b of the rear axle 25 via the second end bearing 72 in the axial direction of the rear axle 25. In addition, the lateral surface of the outer race 72c is abutted against the second end holding portion 76.

In addition to the first end bearing 71, the lateral surface of the outer race 72c of the second end bearing 72 is held by the second end holding portion 76 provided on the gear case 61.

Therefore, the fastening rigidity can further be increased in the axial direction of the rear axle 25.

A radial ball bearing is applied to the one bearing 76a supporting the shaft of the pinion gear and a needle bearing is applied to the other bearing 76b.

As shown in FIG. 3, the final gear transmission mechanism 65 includes a pinion gear position adjusting shim 85, rear axle position adjusting shims 86a and 86b, seal members 87a and 87b, and collar members 88a and 88b interposed between the rear axle 25 and the bearing. In addition, the final gear transmission mechanism 65 includes a first end outer circumference holding surface 89 for holding the outer circumferential surface of the outer race of the first end bearing provided on the gear case 61, and second end outer circumference holding surface 90 provided on the gear case 61 for holding the outer circumferential surface of the outer race of the first end bearing provided on the gear case 61.

The first end bearing 71 is a bearing closer to the ring gear 68. As described above, the first and second bearings 91, 92 are juxtaposed to each other from the inside to outside of the vehicle. The lateral surface of the outer race 91c of the first bearing 91 is held by the first end holding portion 75 disposed perpendicularly to the rear axle 25.

The second end bearing 72 is a bearing disposed closer to the fastening member 73. The lateral surface of the inner race 72a of the second end bearing 72 is fastened to the rear axle 25 by the fastening member 73. Specifically, the second end bearing 72 is disposed such that the inner race 72a thereof is fastened to the rear axle 25 by the fastening member 73.

As described above, the first end 25a of the rear axle 25 is held by the first end holding portion 75 via the first end bearing 71 and the other end 25b of the rear axle 25 is held by the fastening member 73 via the second end bearing 72. Such configuration increases the fastening rigidity of the rear axle 25, and provides satisfactory assembly performance without impairing workability with respect to the assembly of the rear axle.

Usually, the second end bearing 72 is protected from disturbance by the cap 77. In addition, when the rear axle 25 is maintained, the cap 77 is removed, the fastening member 73 is removed, the second end bearing 72 is removed, the gear case 61 is opened and the rear axle 25 is removed. Therefore, such configuration, does not impair maintenance and performance of the rear axle 25.

An attachment structure of the brake disk is described below.

A brake disk 81 is attached to the first end 25a of the rear axle 25. The brake disk is positioned such that it is gripped by the first end 25a of the rear axle 25 and the rear wheel 24. More specifically, the rear wheel 24 is fastened to the rear axle 25 via a rear wheel attachment bolt 82. The brake disk 81 is co-fastened to the rear wheel 24. A small bolt 83 is provided for temporarily locking the brake disk 81 to the rear axle 25 in advance, before the rear wheel 24 is attached.

Since the brake disk 81 is positioned such that it is gripped by the rear axle 25 and the rear wheel 24, when the rear axle 25 is attached to the rear wheel 24, the brake disk 81 is locked and the rear wheel 24 is abutted against the brake disk 81 for co-fastening. Since the brake disk 81 is co-fastened to the rear wheel 24, a fastening member exclusively for securing the brake disk 81 is eliminated to reduce assembly man-hours.

An operation of the motorcycle having the final gear transmission mechanism according to the present invention is described below.

Figure 4A:
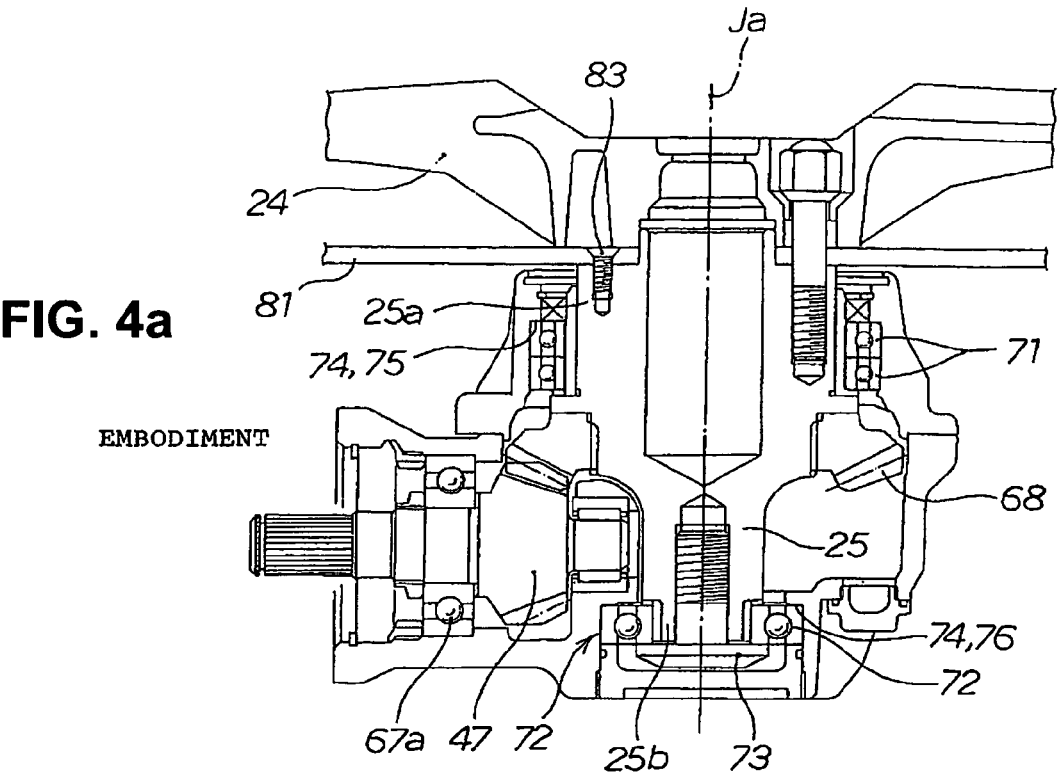
FIG. 4A illustrates an embodiment of a final gear transmission mechanism according to the present invention.
Figure 4B:
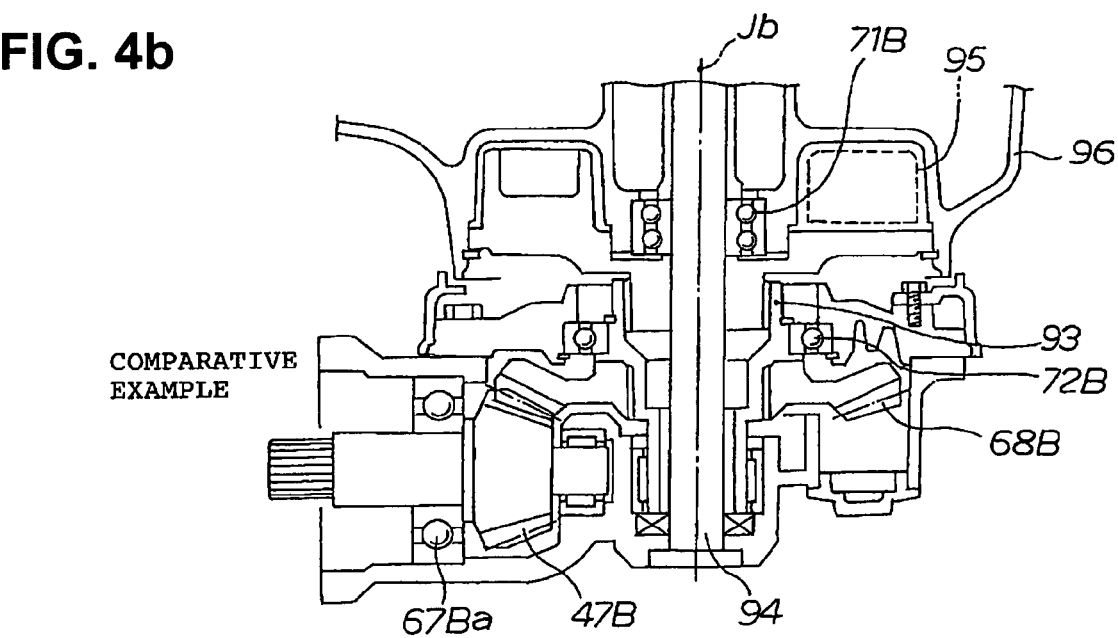
FIG. 4B illustrates an embodiment of a final gear transmission mechanism according a comparative example.

FIGS. 4A and 4B illustrate an embodiment of the final gear transmission mechanism according to the present invention and a comparative example, respectively.

FIG. 4A illustrates an embodiment according to the present invention. The rear axle 25 is held by the first end holding portion 75 and the fastening member 73 not to be movable in the axial direction Ja of the rear axle 25. Therefore, the fastening rigidity of the rear axle 25 attached with the ring gear 68 can significantly be increased.

As shown in FIG. 4B, a cylindrical ring gear shaft 93 corresponding to a rear axle 25B attached with a ring gear 68B is insertably fitted to an axial member 94 as a fixed shaft. In addition, the ring gear shaft 93 is disposed on the side of a wheel and held only by the side of a damper holder 96 having a damper member 95.

In other words, the gear shaft 93 is not provided with an arrangement for restricting the movement thereof in an axial Jb direction from the outside of a vehicle. Thus, torque variations and/or velocity variations may probably cause variable meshing state between a ring gear 68B and a pinion gear 47B. If the meshing state varies, for example, gear noise or the like occurs in some cases.

Now referring to FIG. 4A, the final gear transmission mechanism 65 includes the first end holding portion 75 for holding the first end 25a of the rear axle 25 attached with the ring gear 68 via the first end bearings 71 in the axial direction of the rear axle 25; and the fastening member 73 for fastening the second end bearing 72 to the second end 25b of the axle 25 from the outside of the gear case 61.

Since the first end 25a of the rear axle is held by the first end holding portion 75 and the second end 25b of the rear axle is fastened by the fastening member 73, the rear axle 25 is held such that the rear axle does not move in the axial direction Ja. In other words, according the configuration of the final gear transmission mechanism of the present invention, during operation of the motorcycle, the rear axle 25 is substantially immovable in the axial direction thereof. Accordingly, the fastening rigidity of the rear axle 25 attached with the ring gear 68 can significantly be increased.

Since the ring gear 68 is a member for transmitting the rotary drive force of the engine 16 to the rear axle 25, it is subjected to large force. Since the fastening rigidity of the rear axle 25 attached with the ring gear 68 is increased, the movement of the ring gear 68 in the axial direction Ja can be suppressed.

If the movement of the ring gear 68 in the axial direction of the rear axle is suppressed, the meshing state between the ring gear 68 and the pinion gear 47, disposed closed to the drive shaft 44 to be meshed therewith, becomes less variable. If the variation of the meshing state between the ring gear 68 and the pinion gear 47 becomes hard to occur, the variation in drive torque becomes less variable, which allows for stable transmission of the drive force. In addition, gear noise with respect to the transmission of the rotary drive force can be reduced.

Incidentally, the present invention is applied to the motorcycle in the embodiment; however, it is reasonable that the invention is applied to general saddle-ride type vehicles.

The present invention is suitable for motorcycles having a final gear transmission mechanism.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A motorcycle comprising
a body frame;
a pivot shaft provided in the body frame;
a swing arm swingably mounted on the pivot shaft;
a rear wheel mounted on a leading end of the swing arm via a rear axle, which is operable to rotate with said rear wheel;
a drive shaft disposed in the swing arm; said drive shaft being configured to transmit a rotary drive force of an engine of the motorcycle;
a final gear transmission mechanism interposed between the drive shaft and the rear wheel; said final gear transmission mechanism being configured to transmit the rotary drive force of the engine to the rear wheel; and
a disk brake attached to a first end of the rear axle such that said disk brake is gripped by the first end of the rear axle and the rear wheel;
wherein the final gear transmission mechanism includes:
a gear case mounted on the leading end of the swing arm for supporting the rear axle for transmitting the rotary drive force of the engine to the rear wheel;
a first end bearing and a second end bearing attached to the gear case for supporting the first end and a second end of the rear axle, respectively;
a ring gear mounted on the rear axle for transmitting the rotary drive force of the engine to the rear axle;
a first end holding portion attached to the gear case for holding the first end of the rear axle via the first end bearing in an axial direction of the rear axle; and
a fastening member for fastening the second end of the rear axle via the second end bearing from the outside of the gear case; and
the second end bearing having
an inner race, which rotates with said rear axle; and
an outer race, which is fixed to the gear case;
said inner race being fastened to the rear axle by the fastening member.

2. The motorcycle according to claim 1, wherein said final gear transmission mechanism further comprises a second end holding portion for holding the second end of the rear axle via the second end bearing in the axial direction of the rear axle; and wherein a lateral surface of the outer race of the second end bearing is abutted against the second end holding portion.

3. The motorcycle according to claim 1, wherein in an assembled state, said fastening member is substantially immovable in an axial direction of the rear axle.

4. The motorcycle according to claim 1, wherein in an assembled state, said ring gear is substantially immovable in an axial direction of the rear axle.

5. The motorcycle according to claim 2, wherein in an assembled state, said ring gear is substantially immovable in an axial direction of the rear axle.

6. The motorcycle according to claim 2, wherein in an assembled state, said fastening member and said ring gear are substantially immovable in an axial direction of the rear axle.

7. A motorcycle comprising
a body frame;
an engine mounted on said body frame;
a pivot shaft provided in the body frame;
a swing arm swingably mounted on the pivot shaft;
a rear wheel mounted on a rear end portion of the swing arm via a rear axle, which is operable to rotate with the rear wheel;
a drive shaft for transmitting a rotary drive force of the engine to the rear wheel; said drive shaft being disposed in said swing arm;

a final gear transmission mechanism interposed between the drive shaft and the rear wheel; said final gear transmission mechanism being configured to transmit the rotary drive force of the engine received from said drive shaft to the rear wheel; and a disk brake attached to a first end of the rear axle such that said disk brake is gripped by the first end of the rear axle and the rear wheel; and wherein the final gear transmission mechanism includes:
- a gear case mounted on said end portion of the swing arm for supporting the rear axle;
- a first end bearing and a second end bearing each attached to the gear case for supporting the first end and a second end of the rear axle, respectively;
- a ring gear mounted on the rear axle for transmitting the rotary drive force of the engine to the rear axle;
- a first end holding portion attached to the gear case for holding the first end of the rear axle via the first end bearing in an axial direction of the rear axle; and
- a fastening member for fastening the second end of the rear axle via the second end bearing from outside of the gear case; and
- the second end bearing having
  - an inner race, which rotates with the rear axle; and
  - an outer race, which is fixed to the gear case;
- wherein said inner race is fastened to the rear axle by the fastening member; and wherein in an assembled state, said fastening member is substantially immovable in an axial direction of the rear axle.

8. A motorcycle according to claim 7, wherein said final gear transmission mechanism further comprises a second end holding portion for holding the second end of the rear axle via the second end bearing in the axial direction of the rear axle; and wherein a lateral surface of the outer race of the second end bearing is abutted against the second end holding portion.

9. A motorcycle according to claim 7, wherein in an assembled state, said ring gear is substantially immovable in an axial direction of the rear axle.

10. A motorcycle according to claim 8, wherein in an assembled state, said ring gear is substantially immovable in an axial direction of the rear axle.

11. In a motorcycle including a body frame; an engine mounted on said body frame; a pivot shaft provided in the body frame; a swing arm swingably mounted on the pivot shaft; a rear wheel mounted on a rear end portion of the swing arm via a rear axle, which is operable to rotate with the rear wheel; a drive shaft for transmitting rotary drive force of the engine to the rear wheel; and said drive shaft being disposed in said swing arm; the improvement comprising a final gear transmission mechanism interposed between the drive shaft and the rear wheel;

said final gear transmission mechanism comprising
- a gear case mounted on said end portion of the swing arm for supporting the rear axle;
- a first end bearing and a second end bearing each attached to the gear case for supporting a first end and a second end of the rear axle, respectively;
- said second end bearing having
  - an inner race, which rotates with the rear axle, and
  - an outer race, which is fixed to the gear case;
- a ring gear mounted on the rear axle for transmitting the rotary drive force of the engine to the rear axle;
- a first end holding portion attached to the gear case for holding the first end of the rear axle via the first end bearing in an axial direction of the rear axle; and
- a fastening member for fastening the second end of the rear axle via the second end bearing from the outside of the gear case;
- wherein said inner race of the second end bearing is fastened to the rear axle by the fastening member; and wherein in an assembled state, said fastening member is substantially immovable in an axial direction of the rear axle; and wherein said motorcycle further comprises a disk brake attached to the first end of the rear axle such that said disk brake is gripped by the first end of the rear axle and the rear wheel.

12. A motorcycle according to claim 11, wherein said final gear transmission mechanism further comprises a second end holding portion for holding the second end of the rear axle via the second end bearing in the axial direction of the rear axle; and wherein a lateral surface of the outer race of the second end bearing is abutted against the second end holding portion.

13. A motorcycle according to claim 11, wherein in an assembled state, said ring gear is substantially immovable in an axial direction of the rear axle.

14. A motorcycle according to claim 12, wherein in an assembled state, said ring gear is substantially immovable in an axial direction of the rear axle.

\* \* \* \* \*